US010595260B2

(12) United States Patent
Haberland et al.

(10) Patent No.: US 10,595,260 B2
(45) Date of Patent: Mar. 17, 2020

(54) CONCEPT FOR LOAD BALANCING IN A RADIO ACCESS NETWORK

(75) Inventors: Bernd Haberland, Fellbach (DE); Werner Rehm, Stuttgart (DE)

(73) Assignee: Alcatel Lucent, Nozay (FR)

( * ) Notice: Subject to any disclaimer, the term of this patent is extended or adjusted under 35 U.S.C. 154(b) by 789 days.

(21) Appl. No.: 14/111,386

(22) PCT Filed: Jan. 25, 2012

(86) PCT No.: PCT/EP2012/051109
§ 371 (c)(1),
(2), (4) Date: Oct. 11, 2013

(87) PCT Pub. No.: WO2012/139781
PCT Pub. Date: Oct. 18, 2012

(65) Prior Publication Data
US 2014/0029431 A1  Jan. 30, 2014

(30) Foreign Application Priority Data

Apr. 12, 2011 (EP) .................................. 11305432

(51) Int. Cl.
*H04W 88/08* (2009.01)
*H04W 40/04* (2009.01)
(Continued)

(52) U.S. Cl.
CPC .............. *H04W 40/04* (2013.01); *H02J 1/14* (2013.01); *H04W 88/08* (2013.01);
(Continued)

(58) Field of Classification Search
CPC ... H04L 45/10; H04L 67/1002; H04L 47/125; H04L 47/12; H04L 41/5041; H04L 25/00;
(Continued)

(56) References Cited

U.S. PATENT DOCUMENTS

2007/0008877 A1*  1/2007  Rouffet ................... H04L 25/14
                                                          370/208
2007/0121540 A1*  5/2007  Sharp ..................... H04W 92/02
                                                          370/328

(Continued)

FOREIGN PATENT DOCUMENTS

CN       101431470 Y       5/2009
CN       101682340 X       3/2010
(Continued)

OTHER PUBLICATIONS

D-Link: "User Manual DIR-451 Version 1.3," XP002658811, 83 pages, Dec. 7, 2007.
(Continued)

*Primary Examiner* — Salvador E Rivas
(74) *Attorney, Agent, or Firm* — Fay Sharpe LLP

(57) ABSTRACT

A concept for balancing a load in a mobile communication network, comprising receiving 130 receive data from a radio transceiver using a first interface and determining 140 a first receive data packet and a second receive data packet from the receive data, the first receive data packet and the second receive data packet being associated to different services. The concept comprises forwarding 150 the first receive data packet to a first processing unit using a second interface, and forwarding the second receive data packet to a second processing unit using the second interface.

21 Claims, 8 Drawing Sheets

(51) Int. Cl.
*H02J 1/14* (2006.01)
*H04W 92/20* (2009.01)
*H04W 76/27* (2018.01)
*H04L 29/08* (2006.01)
*H04W 52/26* (2009.01)

(52) U.S. Cl.
CPC ..... *H04L 29/08144* (2013.01); *H04W 52/265* (2013.01); *H04W 76/27* (2018.02); *H04W 92/20* (2013.01)

(58) Field of Classification Search
CPC ............... H04L 29/08144; H04H 60/31; H04J 2203/0098; H04W 28/08; H04W 76/27; H04W 52/265; H02J 1/14
See application file for complete search history.

(56) References Cited

U.S. PATENT DOCUMENTS

| | | | | |
|---|---|---|---|---|
| 2008/0119198 | A1* | 5/2008 | Hettstedt | H04W 16/06 455/453 |
| 2008/0222647 | A1* | 9/2008 | Taylor | H04L 67/34 718/105 |
| 2010/0118751 | A1* | 5/2010 | Sugiyama | H04B 1/406 370/310 |
| 2010/0151831 | A1* | 6/2010 | Hao | H04M 3/53325 455/412.2 |
| 2010/0323723 | A1* | 12/2010 | Gerstenberger | G01S 5/0226 455/456.5 |
| 2011/0038264 | A1* | 2/2011 | Ishii | H04L 47/10 370/238 |
| 2011/0286465 | A1* | 11/2011 | Koodli | H04W 68/00 370/401 |
| 2011/0310810 | A1* | 12/2011 | Kenington | H04W 88/085 370/329 |
| 2012/0147894 | A1* | 6/2012 | Mulligan | G06F 9/45533 370/395.53 |

FOREIGN PATENT DOCUMENTS

| | | |
|---|---|---|
| CN | 101834655 Y | 9/2010 |
| EP | 1 450 572 A1 | 8/2004 |
| EP | 1 589 773 A1 | 10/2005 |
| JP | 2010-98737 A | 4/2010 |
| JP | 2010-213007 | 9/2010 |
| JP | 2010-219847 A | 9/2010 |
| JP | 2011-504677 A | 2/2011 |
| WO | 2008/146330 A1 | 12/2008 |
| WO | 2009/098303 A1 | 8/2009 |
| WO | WO 2009/132929 A1 | 11/2009 |

OTHER PUBLICATIONS

"FRITZ!Box 6840 LTE," Configuration and Operation, XP002658812, pp. 1-2 and 11-29, Mar. 1, 2011.
International Search Report for PCT/EP2012/051109 dated Apr. 24, 2012.

* cited by examiner

CONCEPT FOR LOAD BALANCING IN A RADIO ACCESS NETWORK

Embodiments of the present invention relate to load balancing in a radio access network, more particularly but not exclusively to load balancing for baseband processing in a radio access network.

BACKGROUND

Demands for higher data rates for mobile services are steadily increasing. At the same time modern mobile communication systems as $3^{rd}$ generation systems (3G as abbreviation) and $4^{th}$ generation systems (4G as abbreviation) provide enhanced technologies which enable higher spectral efficiencies and allow for higher data rates and cell capacities. As the demand for high-rate services grows faster than the cell capacities, operators are urged to increase the number of cells in their networks, i.e. the density of base stations increases. Base station transceivers are major contributors to the overall power consumption of a mobile communication network and therewith also major contributors to the operational expenditures (OPEX as abbreviation) operators are facing. One power saving strategy is to move processing capacity away from the base station transceivers and towards centralized processing units providing processing capabilities for several base station transceivers. The processing equipment of a base station transceiver consumes a significant part of a base station transceiver's total power, although the processing capabilities of a base station transceiver are only fully exploited in high load conditions, which do not occur permanently, but rather during peak hours only.

Currently, the radio access of mobile networks (RAN as abbreviation for Radio Access Network) uses base stations or base station transceivers, as e.g. eNodeBs for the most recent technology LTE (as abbreviation for Long Term Evolution), handling all radio, baseband and control functions. These base stations consist of voluminous antennas at elevated positions with electronic systems requiring considerable spatial installation volume. In addition, supplementary systems for power supply, air conditioning, etc. are to be installed in close proximity. In densely populated areas such installations are to be repeated over a grid of ~1 km or less mesh width.

Much of the entire RAN's CAPEX (as abbreviation for Capital Expenditure) and OPEX is therefore attributed to each site's individual processing units, as for example site rent, infrastructure, processing hardware, maintenance, etc. Several approaches to cut at least a big share of these cost elements have been subject to recent research activities. Some solutions reduce emitted power and processing complexity and therewith reduce required volume, however, these solutions are at the expense of increasing the number of required sites.

SUMMARY

Embodiments of the present invention are based on the finding that the cost efficiency of a radio access network can be improved by moving processing capabilities away from the radio front ends and by using cloud computing or load balanced processing units as processing capability. Such processing capability can be shared by a number of radio front ends, therewith the overall processing capability can be utilized more efficiently. Embodiments may therefore provide a concept with a reduced overall processing capacity therewith reducing the overall power consumption, the OPEX and CAPEX of a mobile communication system.

Embodiments may provide network elements or entities, which provide an architecture for radio access networks that integrates these cloud computing elements. Embodiments may be further based on the finding that cloud computing promises lower operating cost by a shared use of large installed processing resources. In addition, installation costs can be reduced by scaling effects of hardware and lower requirements (per user) for costly peripheral equipment and hardware.

Embodiments may provide a sophisticated load balancing for installed processing resources taking into account different load profiles over time for indoor, e.g. enterprise or residential, or outdoor applications. Embodiment may achieve a significant reduction of sites and required hardware, leading to OPEX and CAPEX reduction for the operators.

In embodiments, the RAN architecture may be composed of a remote radio head (RRH for abbreviation), which establishes a radio front end, i.e. which receives and transmits the actual radio signals and establishes at least one radio cell. In the following two directions of transmission will be considered. The first one is referred to as downlink or forward link, it refers to a transmission from the RAN, i.e. the RRH, to a mobile equipment in the coverage area. The second one is also referred to as uplink or reverse link, it refers to a transmission from a mobile equipment to the RAN, i.e. the RRH. In the uplink the RRH may convert the received radio signals from a transmission-band to baseband receive signals and provide the baseband receive signals to a load balancer. In the downlink the RRH may convert a baseband transmit signal to the transmission-band and transmit the signal using one or multiple antennas. In the following it will be referred to the transmission-band as a frequency band. In some embodiments the transmission-band may comprise a sub-band for transmission and a sub-band for reception of radio signals, as e.g. in a frequency division duplex (FDD for abbreviation) system. In some embodiments the same transmission-band may be used for transmission and reception as in a time division duplex (TDD for abbreviation) system.

In some embodiments the RRHs may provide Tx (as abbreviation for transmission), Rx (as abbreviation for reception) and antenna functions and they can be spatially separated from associated baseband processing units so that the latter can be combined within a cluster of several baseband processing units. Embodiments can be further based on the finding that this may open the path to apply technologies of cloud computing, establish load balancing and directly reduce the number of required processing sites and in parallel the associated installation cost, but also maintenance and power consumption.

In other words, embodiments may provide an architecture for a RAN with RRHs, a load balancing entity and processing units. The load balancing entity may distribute or route the load received from the RRHs to the processing units, it may further route the load received form the processing units to the RRHs.

Embodiments may therewith provide an apparatus for balancing a load in a mobile communication network, in the following also referred to as load balancer, which comprises a first interface for communicating with a radio transceiver, which can for example be realized as an RRH. The apparatus further comprises a second interface for communicating with a first processing unit and for communicating with a second or additional processing units. The first and the additional processing units may also be referred to as baseband unit (BBU as abbreviation). Moreover, the apparatus comprises means for receiving a baseband receive signal from the radio transceiver using the first interface, means for determining a first receive data packet and a second receive data packet from the baseband receive signal, wherein the first receive data packet and the second receive data packet are associated to different services. In other words, the first and the second data packet may correspond to data packets associated to different users; they can also correspond to data packets associated to the same user but to different services. The apparatus further comprises means for forwarding the first receive data packet to the first processing unit using the second interface, and for forwarding the second receive data packet to the second processing unit using the second interface. In other words, the apparatus is adapted for determining the data packets of different services in the uplink and for routing the data packets to different processing units. The apparatus can therewith be adapted for routing data packets associated with different services and received from the same RRH to different processing units, e.g. based on a load balancing criterion.

Hence, embodiments may achieve a baseband processing scheme in a distributed or cloud-like manner, since the baseband processing can be carried out by a plurality of different processing units, which can be spatially separated. Embodiments may achieve the advantage that more processing power can be made available through utilization of a distributed network of processing units. Moreover, embodiments may provide the advantage that scalable processing power can be made available per radio cell, since the services of a radio cell can be demultiplexed into service or user specific data packets, which can then in turn be routed to different processing units. In other words, in an extreme scenario one processing unit can be made available per service rather than per cell. In another extreme scenario, services of multiple cells can be processed by a single processing unit. This flexibility enables enhanced load balancing concepts or strategies.

Accordingly, embodiments can be adapted to the downlink direction. In such embodiments the apparatus can further comprise means for receiving a first transmit data packet from the first processing unit using the second interface, and means for receiving a second transmit data packet from the second processing unit using the second interface, the first transmit data packet and the second transmit data packet are associated to different services. Moreover, the apparatus may comprise means for composing a baseband transmit signal based on the first transmit data packet and based on the second transmit data packet. Furthermore, in such an embodiment the apparatus can comprise means for forwarding the baseband transmit signal to the radio transceiver using the first interface.

In other words, in embodiments the means for determining can be adapted for demultiplexing the first and the second receive data packet from the received data. For example, in a CDMA (as abbreviation for Code Division Multiple Access) system, the different services or signals, can be distinguished by orthogonal channelization codes. Each channelization code carries data of a certain service. The radio signal and also the baseband signal correspond to a superposition of the signals for all services to be provided by a cell, i.e. all the channelization codes weighted with the services' data. The superposition can for example be an addition of all signals. Consequently, such superposition has to be composed before transmission and decomposed after reception. This process is also referred to as multiplexing and demultiplexing. Hence, in embodiments the means for composing can be adapted for composing the transmit baseband signal by multiplexing the first transmit data packet and the second transmit data packet, the first transmit data packet and the second transmit data packet are associated to different services provided by the mobile communication network in a coverage area of the radio transceiver. In other embodiments the apparatus can be adapted for routing the data packets only, while the demultiplexing and multiplexing functionality is carried out at another network entity. The means for determining can then be adapted for receiving the already demultiplexed first and second data packets. Accordingly, the apparatus may comprise means for forwarding the first transmit data packet and the second transmit data packet using the first interface, while the multiplexing is carried out by another network entity subsequently.

In embodiments, the radio transceiver may for example correspond to a transceiver for a GSM- (as abbreviation for Global System for Mobile communication), an EDGE- (as abbreviation for Enhanced Data Rates for GSM Evolution), a UMTS- (as abbreviation for Universal Mobile Telecommunication System), an LTE- (as abbreviation for Long Term Evolution), or an LTE-A- (as abbreviation for LTE-Advanced) mobile communication system. The radio transceiver may correspond to a remote radio head (RRH as abbreviation) of a mobile communication system and/or the first interface may correspond to a common public radio interface (CPRI as abbreviation).

The first processing unit and the second processing unit may correspond to baseband units of a mobile communication system. A baseband unit is a processing unit for processing baseband signals of radio signals to be transmitted or having been received in a transmission-band. The first interface can be adapted for exchanging complex valued digital baseband data with the radio transceiver and the second interface can be adapted for exchanging complex valued digital baseband data with the first and the second processing unit. The apparatus can further comprise additional interfaces for communicating with another apparatus, e.g. for exchanging control information, such as an X2-interface as part of the 3GPP (as abbreviation for $3^{rd}$ Generation Partnership Project) specifications for LTE.

The first and the second receive or transmit data packets can refer to different radio bearers, a radio bearer being a protocol context for a data service of a user. In other words, a user may utilize multiple services, which are provided using different radio bearers. A radio bearer can be established utilizing protocols of multiple layers. A prominent example is the signaling radio bearer (SRB for abbreviation) for exchanging signaling or control information of layer 3, RRC (as abbreviation for Radio Resource Control) as an example in UMTS or LTE. Such an SRB involves a protocol context, i.e. it uses the service provided by layer 2 to exchange layer 3 control information or signaling. The service provided by layer 2 is referred to as the radio bearer. The C-plane (as abbreviation for Control-plane) radio bearers, which are provided by RLC (as abbreviation for Radio Link Control) to RRC, are denoted as signaling radio bearers, cf. e.g. 3GPP Specification, Radio Interface Protocol Architecture 3GPP TS 25.301 V 10.0.0.

In UMTS or LTE the physical layer (layer 1 or PHY as abbreviation), the MAC-layer (layer 2 or as abbreviation for Medium Access Control), RLC-layer and RRC can be involved. All of these protocols have been standardized by the 3GPP and their respective specifications are published and are considered as known in the following.

The means for forwarding can be adapted for forwarding data packets of different radio bearers received from the radio transceiver to at least two different processing units from a plurality of processing units based on a load balancing criterion. Such a criterion may for example be an equally shared distribution of the load among the processing units. Another criterion may be to optimize the power consumption of the processing units. For example, some processing units may be switched off for as long as other active processing units can handle the load. In such an embodiment the apparatus may further comprise means for switching on and off processing units in order enhance the processing capacity when needed and to adapt the processing capability to the respective load situation.

In embodiments the first interface may correspond to an optical interface for optical communication with the radio transceiver. The second interface can also correspond to an optical interface for optical communication with the first or the second processing unit. In embodiments, any interfaces or communication technology may be utilized for the communication between RRH, load balancer and BBU, for as long as it provides enough bandwidth, i.e. for as long as it provides a high enough data rate and low enough delays.

In embodiments the apparatus may be further adapted for performing load balancing, routing, O&M (as abbreviation for Operation and Maintenance), cell broadcast functions (of protocol Layer 3), call processing for the RRC protocol, and/or multi cell packet scheduling. Embodiments may further provide a baseband unit for processing a baseband receive signal, the baseband receive signal comprises a plurality of data packets. The baseband unit comprises an interface for receiving the baseband receive signal from a load balancing entity and means for determining a first receive data packet and a second receive data packet from the baseband receive signal, the first receive data packet and the second receive data packet are again assumed to be associated to different services. In other words, the means for determining can also be adapted for demultiplexing the baseband receive signal in the BBU.

In other words, the above described architecture comprising RRH, load balancer and BBU may enable demultiplexing and multiplexing (demux and mux as abbreviations) of the baseband receive and transmit signals at the RRH, at the load balancer or the BBU. It is to be noted that in some embodiments one demux/mux functionality may be enough, in other embodiments multiple or subsequent demux/mux functionalities may be implemented.

The baseband unit may further comprise means for processing the first receive data packet and for processing the second receive data packet. Accordingly, for the downlink direction the baseband unit can further comprise means for receiving a first transmit data packet and means for receiving a second transmit data packet. Furthermore, the baseband unit may comprise means for composing a baseband transmit signal based on the first transmit data packet and based on the second transmit data packet, and means for providing the baseband transmit signal to the load balancing entity using the interface. In other words the baseband unit may comprise the demux/mux functionality in some embodiments. The baseband unit can be further adapted for performing signal processing according to PHY, MAC (as abbreviation for Medium Access Control protocol), RLC (as abbreviation for Radio Link Control protocol) for a radio bearer and/or cell broadcast functions. Moreover, embodiments may provide a remote radio head for communicating radio signals, a radio signal being received or transmitted from or to a plurality of transceivers. In other words, the RRH may establish one or more cells of the mobile communication system. In some embodiments a cell may have multiple sectors. The RRH comprises means for receiving a receive signal in a transmission-band and means for converting the receive signal from the transmission-band to a baseband to obtain a baseband receive signal.

Moreover, the RRH comprises means for determining a first receive data packet and a second receive data packet from the baseband receive signal, the first receive data packet and the second receive data packet are assumed to be associated to different services. In other words, the first and the second receive data packet may be associated with different radio bearers, in some embodiments they may be associated with different users. The RRH further comprises an interface for communicating with a load balancing entity and means for forwarding the first and the second receive data packet to the load balancing entity using the interface. In other words, the RRH may carry out the demultiplexing in the uplink.

The remote radio head can further comprise means for obtaining a first transmit data packet and a second transmit data packet from the load balancing entity using the interface. In other words, data packets for downlink transmission can be provided to the RRH. The RRH can comprise means for composing a baseband transmit signal based on the first transmit data packet and the second transmit data packet, i.e. the RRH may carry out the multiplexing for downlink transmission. Moreover, the RRH can comprise means for converting the transmit baseband signal to a transmit signal in the transmission-band and means for transmitting the signal in the transmission-band. In other words, the RRH can be adapted for carrying out the multiplexing before downlink transmission. The remote radio head may further comprise a power amplifier for signal transmission and means for antenna processing.

According to the above, embodiments may provide the corresponding methods. Embodiments may provide a method for balancing a load in a mobile communication network by receiving receive data from a radio transceiver using a first interface and determining a first receive data packet and a second receive data packet from the receive data, the first receive data packet and the second receive data packet are associated to different services. The method may further comprise a step of forwarding the first receive data packet to a first processing unit using a second interface, and forwarding the second receive data packet to a second processing unit using the second interface. In other words, the method may balance the uplink load from multiple RRH between multiple processing units.

For downlink load balancing the method can comprise a further step of receiving a first transmit data packet from the first processing unit using the second interface and a step of receiving a second transmit data packet from the second processing unit using the second interface, the first transmit data packet and the second transmit data packet are associated to different services. The method can comprise a further step of composing a baseband transmit signal based on the first transmit data packet and based on the second transmit data packet, and a step of forwarding the baseband transmit signal to the radio transceiver using the first interface.

Accordingly, embodiments may provide a method for processing a baseband receive signal in a baseband unit in the uplink, the baseband receive signal comprises a plurality of data packets. The method may comprise a step of receiving the baseband receive signal from a load balancing entity and a step of determining a first receive data packet and a second receive data packet from the baseband receive signal, the first receive data packet and the second receive data packet are associated to different services. The method may comprise a further step of processing the first receive data packet and processing the second receive data packet. Moreover, the method can be adapted for downlink transmission, and may comprise receiving a first transmit data packet and receiving a second transmit data packet. The method can comprise a step of composing a baseband transmit signal based on the first transmit data packet and based on the second transmit data packet, and providing the baseband transmit signal to the load balancing entity using the interface.

Furthermore, embodiments may provide the corresponding method for communicating radio signals in a remote radio head, a radio signal being received or transmitted from or to a plurality of transceivers. Such a method comprises receiving a receive signal in a transmission-band and converting the receive signal from the transmission-band to a baseband to obtain a baseband receive signal. The method comprises determining a first receive data packet and a second receive data packet from the baseband receive signal, the first receive data packet and the second receive data packet being associated to different services. Moreover, the method comprises forwarding the first and the second receive data packet to a load balancing entity using the interface. In other words, the method can be adapted for reception of uplink data. Accordingly, the method can be adapted for downlink transmission and may comprise obtaining a first transmit data packet and a second transmit data packet from the load balancing entity using the interface and composing a baseband transmit signal based on the first transmit data packet and the second transmit data packet. The method may further comprise converting the transmit baseband signal to a transmit signal in a transmission-band and transmitting the signal in the transmission-band.

Embodiments may further provide a system for cloud computing in a mobile communication network, the system may comprise an apparatus for balancing a load according to the above description, a remote radio head 300 according to the above description and/or a baseband processing unit 200 according to the above description. Furthermore embodiments may provide a method for cloud computing in a mobile communication network. The method may comprise demultiplexing a signal from a radio cell to obtain demultiplexed packets and routing the demultiplexed packets to different processing units.

Embodiments may provide a system for cloud computing with multiple RRHs, an apparatus for balancing the load, and multiple BBUs. According to the above, the multiplexing and demultiplexing can be carried out by any one of the above network entities, i.e. by the RRH, the load balancer or the BBU.

Embodiments can further comprise a computer program having a program code for performing one of the above described methods when the computer program is executed on a computer or processor.

BRIEF DESCRIPTION OF THE FIGURES

Some other features or aspects will be described using the following non-limiting embodiments of apparatuses and/or methods and/or computer programs by way of example only, and with reference to the accompanying figures, in which.

DESCRIPTION OF SOME EMBODIMENTS

Figure 1A:
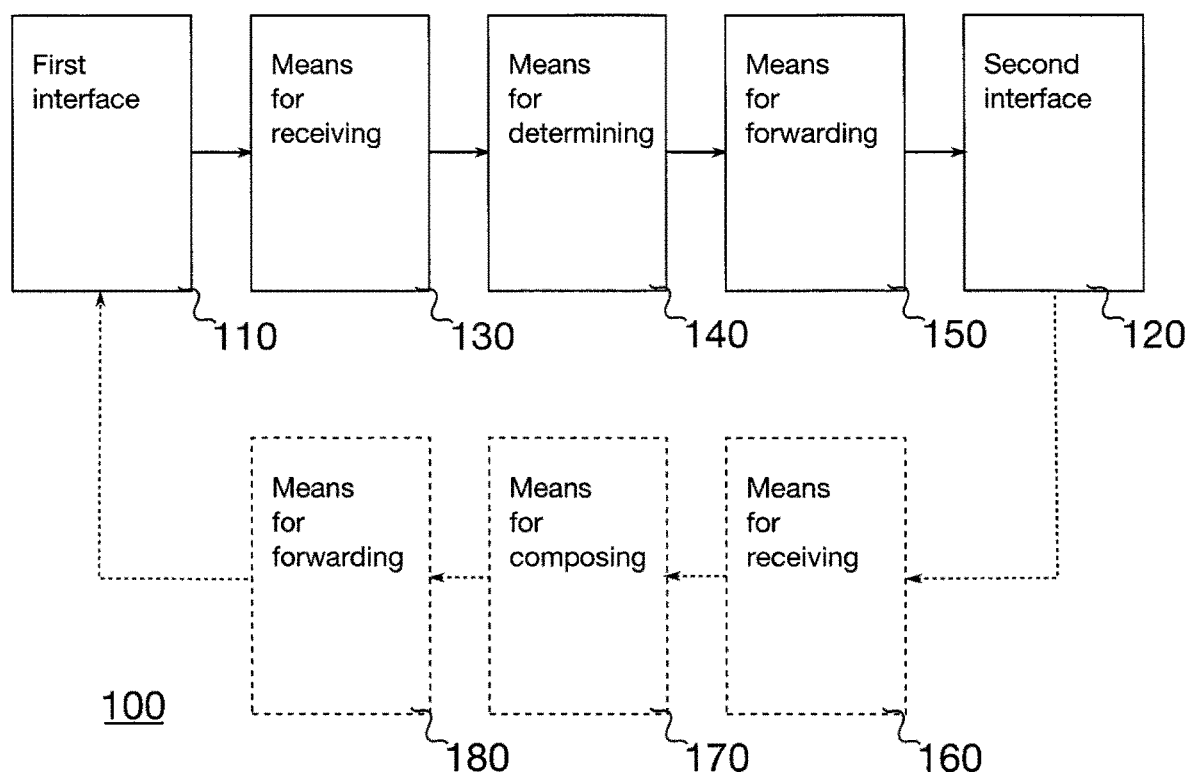
FIG. 1a shows an embodiment of an apparatus for balancing a load in a mobile communication network.

FIG. 1a shows an embodiment of an apparatus 100 for balancing a load in a mobile communication network. The apparatus 100 comprises a first interface 110 for communicating with a radio transceiver. In embodiments the radio transceiver can correspond to a transceiver for a GSM- (as abbreviation for Global System for Mobile communication), an EDGE- (as abbreviation for Enhanced Data Rates for GSM Evolution), a UMTS- (as abbreviation for Universal Mobile Telecommunication System), an LTE- (as abbreviation for Long Term Evolution), an LTE-A- (as abbreviation for LTE-Advanced) mobile communication system, etc. In other words, the radio transceiver may correspond to a remote radio head (RRH as abbreviation) of a mobile communication system. An RRH may comprise a radio front end, i.e. it may be adapted to convert transmission band signals to baseband signals and vice versa, e.g. by means of a mixer, a power amplifier, a low-noise amplifier etc. The radio transceiver may provide or receive baseband representations of radio signals.

The first interface 110 can for example correspond to a common public radio interface (CPRI as abbreviation). The apparatus 100 further comprises a second interface 120 for communicating with a first processing unit and for communicating with a second processing unit. In the embodiment displayed in FIG. 1a, the apparatus 100 uses the second interface 120 for communicating with both, the first and the second processing unit. In other embodiments separate interfaces can be used, i.e. one interface for communicating with the first processing unit and another interface for communicating with the second processing unit. The first interface 110 may correspond to an optical interface for optical communication with the radio transceiver. The second interface 120 can also correspond to an optical interface for optical communication with the first or the second processing unit.

The first processing unit and the second processing unit can correspond to baseband units (BBU for abbreviation) of a mobile communication system, a baseband unit being a processing unit for processing baseband signals of radio signals to be transmitted or having been received in a transmission-band. In other words, the apparatus 100, to which it can also be referred to as load balancer 100 or cloud controller 100, may control communication between a RRH and a BBU. The first interface 110 can be adapted for exchanging complex valued digital baseband data with the radio transceiver or RRH, and the second interface 120 can be adapted for exchanging complex valued digital baseband data with the first and the second processing unit or first and second BBU.

In line with FIG. 1*a*, the apparatus 100 further comprises means for receiving 130 a baseband receive signal from the radio transceiver using the first interface 110 and means for determining 140 a first receive data packet and a second receive data packet from the baseband receive signal, the first receive data packet and the second receive data packet are associated to different services. In embodiments the different services, i.e. the first and the second data packets, can be associated to different users. In other embodiments one user may utilize multiple services, i.e. the first and the second data packet may then be associated with different services of the same user. The term service can refer to protocol services, i.e. protocol contexts. In embodiments for UMTS, LTE or LTE-A networks according to the 3GPP specifications, the first and the second receive or transmit data packets may refer or correspond to different radio bearers, where a radio bearer is a protocol context for a data service of a user.

A radio bearer is a common term used to refer to a Radio Access Bearer (RAB for abbreviation) for a protocol context extending through the lower protocol layers of a radio access network, a Radio Bearer (RB for abbreviation) for a protocol context extending through the first and second layer of a radio access network, and/or a Signaling Radio Bearer (SRB for abbreviation) for a protocol context being terminated within the radio access network and serving for exchange of layer 3 control information. More specifically, within the 3GPP specifications a RAB extends between UE (as abbreviation for User Equipment) and the core network (CN for abbreviation), i.e. a protocol context bridging through the lower layer protocols of the RAN. A radio bearer may correspond to a user plane bearer on RAN level between RNC (as abbreviation for Radio Network controller)/NodeB and UE. Moreover, a signaling radio bearer may correspond to a RAN level bearer for Radio Resource Control and Non-Access-Stratum (NAS for abbreviation) signaling between RNC and UE. As user plane signaling bearer, as e.g. the bearer for SIP (as abbreviation for Session Initiation Protocol) signaling, a radio bearer rather than the SRB is used.

The means for determining 140 can be adapted for demultiplexing the first and the second receive data packet from the received data. In other words, the means for determining 140 may demultiplex data packets associated with different radio bearers from the receive data.

As can be seen in the embodiment shown in FIG. 1*a*, the apparatus 100 further comprises means for forwarding 150 the first receive data packet to the first processing unit using the second interface 120, and for forwarding the second receive data packet to the second processing unit using the second interface 120. As has already been explained, in other embodiments separate interfaces may be used for forwarding the data packets to the first and second processing units. The means for forwarding 150 can be adapted for forwarding data packets of different radio bearers received from the radio transceiver to at least two different processing units from a plurality of processing units based on a load balancing criterion. In other words, the apparatus 100 may carry out data packet routing to the different processing units. The routing can be on a radio bearer basis, i.e. data packets associated to the same radio bearer are routed to the same processing unit. Data packets associated to different radio bearers can potentially, i.e. based on the load balancing criterion, be routed to different processing units.

According to the above description and FIG. 1*a*, the load balancer may route different data packets received from a radio transceiver to different processing units and the demultiplexing of the data packets may also be carried out in the load balancer 100 in the uplink.

In embodiments the apparatus 100 may also be adapted for the respective downlink processing, which is indicated in FIG. 1*a* by the broken line blocks of the diagram. The apparatus 100 may thus further comprise means for receiving 160 a first transmit data packet from the first processing unit using the second interface 120 and means for receiving 160 a second transmit data packet from the second processing unit using the second interface 120. In the embodiment shown in FIG. 1*a* the same interface 120 is used for receiving the first and the second transmit data packet. In embodiments separate interface may be used in line with what is described above with respect to the receive data packets. Moreover, separate interfaces can be used for receive and transmit data packets.

Again the first transmit data packet and the second transmit data packet are associated to different services. The apparatus 100 may further comprise means for composing 170 a baseband transmit signal based on the first transmit data packet and based on the second transmit data packet and means for forwarding 180 the baseband transmit signal to the radio transceiver using the first interface 110. In embodiments, separate interfaces may be used for receiving a baseband receive signal from the radio transceiver and for forwarding the baseband transmit signal to the radio transceiver. The means for composing 170 can be adapted for composing the baseband transmit signal by multiplexing the first transmit data packet and the second transmit data packet, the first transmit data packet and the second transmit data packet are associated to different services provided by the mobile communication network in a coverage area of the radio transceiver. In other words, the load balancer 100 can also be adapted for multiplexing the data packets of multiple radio bearers to obtain the baseband transmit signal.

In summary, embodiments of the load balancer carry out data packet routing to the processing units. In the above described embodiments, the demultiplexing and multiplexing of the data packets may also be carried out in the load balancer, however, in other embodiments, the demultiplexing or multiplexing may also be carried out in the RRH or BBU as will be detailed subsequently.

Generally, other embodiments may realize the demultiplexing/multiplexing functionality in other network entities as for example a remote radio head or a baseband unit, which will be detailed subsequently with the help of FIGS. 1*b* and 1*c*. First an overview of the network architecture will be provided.

Figure 2:
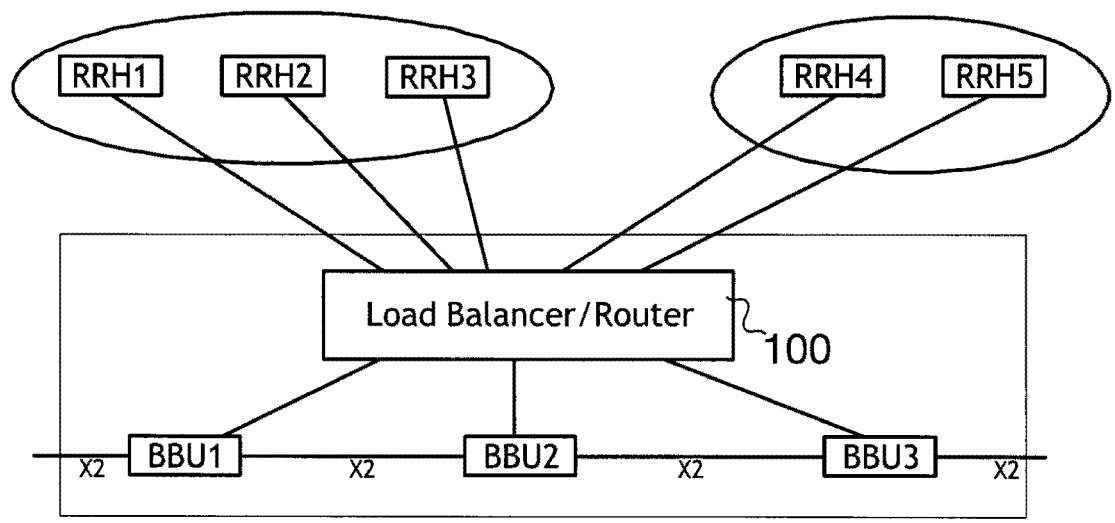
FIG. 2 shows a radio access network with an embodiment of a load balancer.

FIG. 2 shows a RAN with an embodiment of a load balancer 100. The RAN illustrated in FIG. 2 further comprises five radio transceivers or RRHs, which are labeled RRH1, RRH2, RRH3, RRH4, and RRH5. Moreover, the illustration shows three processing units or BBUs, which are labeled BBU1, BBU2, and BBU3. In embodiments, the central load balancer 100 can replace the standard fixed 1:1 association of RRH and BBU by a dynamic rearrangement or routing. Under this approach spare capacity of an individual BBU can support fully or even overloaded companions. With this approach the total capacity of the BBUs may need to be dimensioned along the maximum load of the entire system. Embodiments may therefore limit the need to provide spare capacity at any individual BBU so that it can handle the maximum load on its own that is to be expected for this particular element. Therewith, load profiles between different areas, e.g. indoor/outdoor, business/residential areas can be leveled off and considerable cost savings may be achieved, both on CAPEX and OPEX.

In order to provide most efficient joint processing and eliminate any need for system internal communication via the standard X2 interface the individual BBUs can be co-located or even be virtualized.

Figure 3:
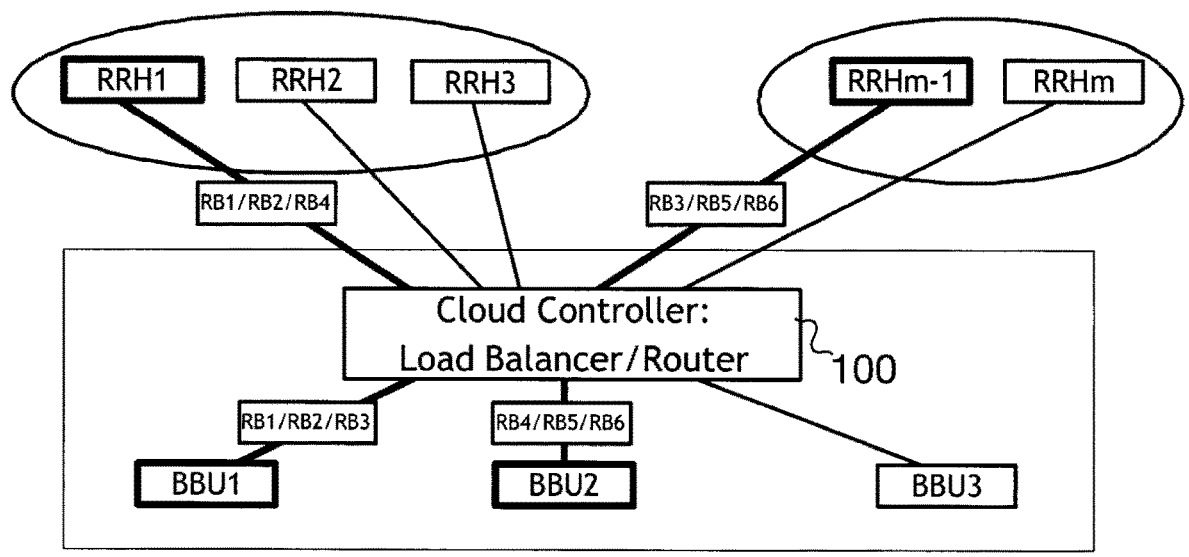
FIG. 3 shows a radio access network with an embodiment of a load balancer for load balancing based on radio bearer routing.

FIG. 3 shows a radio access network with an embodiment of a load balancer 100 for load balancing based on radio bearer routing. Similar to the labeling of FIG. 2, m RRHs are indicated by RRH1, RRH2, RRH3, RRHm−1, RRHm. Moreover, a plurality of BBUs is shown as BBU1, BBU2, and BBU3. Furthermore, several radio bearers (RB as abbreviation) are indicated in FIG. 3. RB1, RB2 and RB4 are associated with RRH1, RB3, RB5 and RB6 are associated with RRHm−1. As it has already been explained above, a radio bearer can be assumed to process the complete RAN protocol stack (User- and Control-Plane) of a particular user, i.e. PDCP (as abbreviation for Packet Data Convergence Protocol), RLC, MAC and PHY for the User-Plane, RRC, PDCP, RLC, MAC and PHY for the Control-Plane, for a certain service.

Summarizing the components shown in FIG. 3, the RAN system comprises several BBUs, numbered 1 . . . n, which may comprise virtual baseband engines to process a flexible set of radio bearers (RB 1 . . . 1) allocated to several cell IDs (as abbreviation for identification), which can be achieved by the embodiment of the load balancer 100. Furthermore, several BBUs can be co-located on one site or even a single BBU can be distributed over several locations, which is also referred to as cloud computing, with a specific internal organization. FIG. 3 further illustrates several RRHs, numbered 1 . . . m, m>n, which may comprise one TRX (as abbreviation for transmit carrier), PA (as abbreviation for Power Amplifier), per cell ID, with or without antenna configuration. Moreover, FIG. 3 shows the embodiment of a cloud controller 100 or load balancer 100 carrying out load balancing and routing, i.e. a mapping of a RB to a cell ID inside a RRH. In addition, the standard core elements like MME (as abbreviation for Mobility Management Entity)/SGW (as abbreviation for Serving Gateway) are to be considered for functions like call processing, IP (as abbreviation for Internet Protocol) address binding, etc. FIG. 3 further shows an exemplary distribution of RBs among various RRHs and BBUs.

Each BBU may handle several individual RBs. One single BBU may perform all processing for one cell ID. Any load balancing among several BBUs requires the assignment of all the RBs of a particular cell ID to more than one BBU, which is carried out by the embodiment of the load balancer 100. The allocation of RBs from different BBUs to a specific cell of a particular RRH is handled by the cloud controller 100 or load balancer 100 with its load balancing and routing functions. This is illustrated exemplarily in FIG. 3, where BBU1 processes RB1-RB3 and BBU2 processes RB4-RB6. The cloud controller 100 allocates RB1, RB2, RB4 to a cell of RRH1 and RB3, RB5, RB6 to a cell of RRHm−1.

Figure 4:
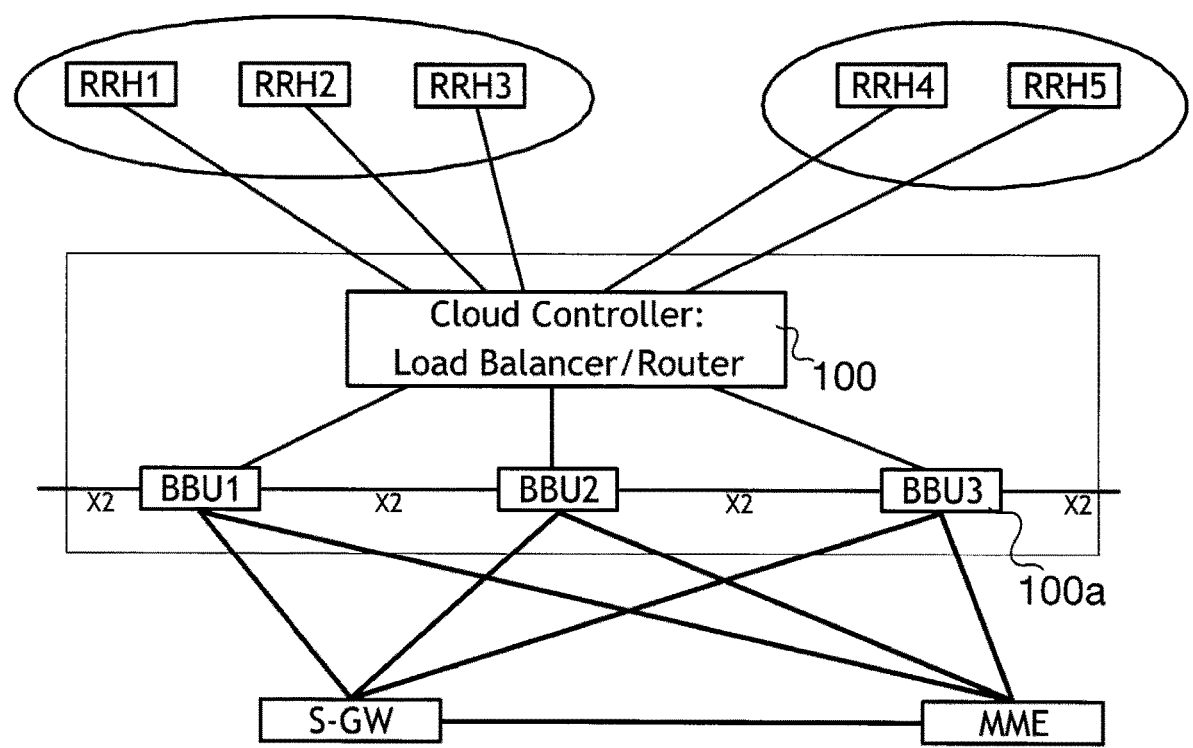
FIG. 4 shows a radio access network with an embodiment of a load balancer and embodiments of baseband units with an X2-interface.

In order to provide an efficient processing in embodiments and an advantageous architecture, several options exist for the assignment of functions. FIG. 4 shows a radio access network with an embodiment of a load balancer and embodiments of baseband units with X2-interfaces interconnecting the BBUs. Moreover, FIG. 4 shows an S-GW which is connected to the BBUs to provide the U-plane data, e.g. via an S1 link. The MME is also connected to the BBU to provide the C-plane data, e.g. via an S1 link. The connections between the RRHs and the cloud controller 100 as well as the connections between the BBUs and the cloud controller 100 can e.g. be implemented using high speed optical links.

As in the previous embodiment the RRHs may comprise TRX, PA, and antenna functionality. The cloud controller 100 may carry out load balancing and routing. The BBU may provide signaling for operation & maintenance (O&M as abbreviation), cell broadcast functions, control functions such as RRC protocol, call processing, packet scheduler, RLC, MAC, PHY.

The X2 interface may serve for communication between BBUs. In this embodiment the full processing, i.e. PHY, MAC, RLC, scheduling, call processing and control functions such as Radio Admission Control, Mobility Control, etc., is within the BBUs. There are high speed optical links to provide the transport of the processed IQ (as abbreviation for inphase and quadrature signal components) samples or baseband data to and from the RRHs via standardized interfaces like CPRI. In addition, the processing of RBs and the packet scheduler for one cell ID can be allocated to different BBUs, requiring an inter-BBU communication via X2-interface for the RB input buffer monitoring and control with very low latency.

In this embodiment fully processed IQ samples as baseband transmit signal for the RRH are to be sent via the cloud controller 100. Any routing function therein requires a packet inspection, i.e. de-multiplexing and after routing another multiplexing of the multi user data stream inside of the cloud controller 100. Alternatively, a companion BBU tasked to process a subset of the full RB package may send its RB signals to the main BBU where the IQ package of the full data stream for one cell ID is going can be prepared. Such embodiments may need an additional communication interface to be established between BBUs and the cloud controller 100 to send RB requests to the cloud controller/load balancer 100. In such an embodiment the apparatus 100a may be comprised in a BBU to carry out preliminary routing, i.e. to determine the routes and to provide the actual load balancer with the outcome, which is indicated by the reference sign 100a in FIG. 4. Moreover, a high communication load to be handled between the BBUs can be foreseen, which may be handled by the X2 functions. Embodiments may organize the load balancing via a cloud controller or via an additional intelligence within the individual BBUs, e.g. an additional SON-like (as abbreviation for Self Organizing Networks) function.

Figure 5:
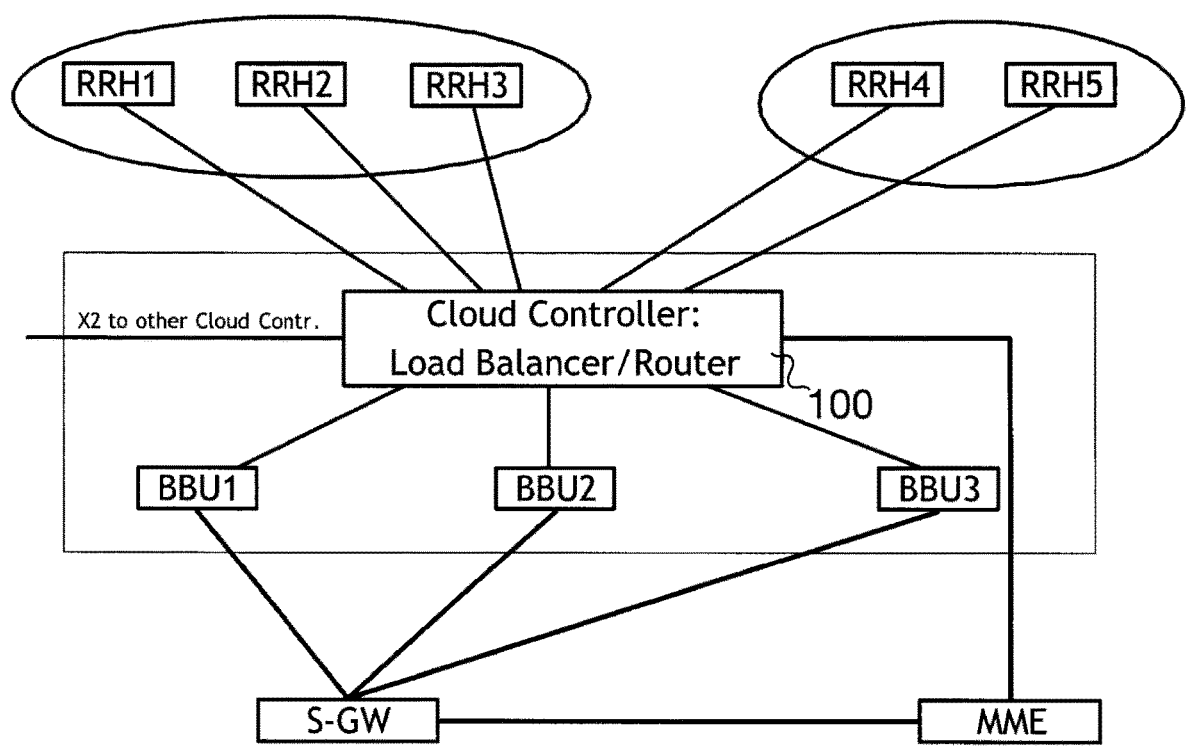
FIG. 5 shows a radio access network with an embodiment of a load balancer with an X2-interface.

FIG. 5 shows a radio access network with an embodiment of a load balancer 100 with an X2-interface. FIG. 5 shows similar components with similar labels as FIG. 4. FIG. 5 shows multiple RRHs which have the same functionality as described above with respect to FIG. 4, i.e. TRX, PA, antenna processing. Moreover, FIG. 5 shows an embodiment of a cloud controller 100 with an X2-interface. In other words, the apparatus 100 may further comprise a third interface for communicating with another apparatus 100 for exchanging control information, where the third interface is exemplified as X2-interface in FIG. 5. The cloud controller 100 may carry out, e.g., load balancing, routing, O&M, cell broadcast functions (L3), call processing (such as RRC protocol), multi cell packet scheduling, etc. The BBU may carry out PHY, MAC, RLC for RB and cell broadcast functions. In this embodiment, the X2-interface to either other cloud controllers or conventional base stations is connected to the cloud controller 100. The apparatus (100) can thus be further adapted for performing load balancing, routing, O&M, cell broadcast functions, call processing for the RRC protocol, and/or multi cell packet scheduling.

In this embodiment, all cell-related processing, such as packet scheduler, control functions and call processing, is handled by the cloud controller 100. Moreover, the cloud controller can be directly connected with the MME, e.g. via an S1-MME interface. In addition, the cloud controller can be aware of the available processing resources inside all connected BBUs. Therefore, the allocation of a user to a cell and the allocation of a RB to a BBU processing resource can be known in one single place, namely the cloud controller 100.

The cloud controller 100 may contact the relevant BBU for input buffer monitoring of a RB and it may take into account the buffer status for its packet scheduler decision.

The allocation of the packet scheduler in the form of a "multi cell" scheduler within the cloud controller may have the additional advantage to perform an improved coordination between various cells and can be used for inter-cell interference mitigation over the time, frequency and spatial domains. In addition, embodiments may enable network MIMO technologies as e.g. Cooperative Multi Point (CoMP as abbreviation), that do promise considerable capacity improvements. Due to the fact that the call processing, i.e. cell and broadcast, functions are located in the cloud controller in this embodiment, the RRC payloads can be sent to the relevant BBUs where the layer 2 and layer 1 of the RBs and the cell broadcast functions are allocated.

Figure 6A:
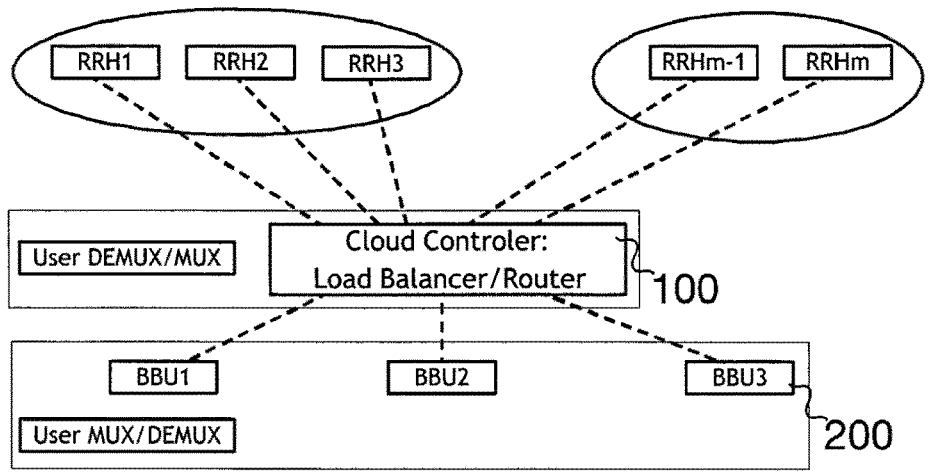
FIG. 6a shows a radio access network with an embodiment of a load balancer with demultiplexing/multiplexing at the load balancer and the baseband unit.
Figure 6B:
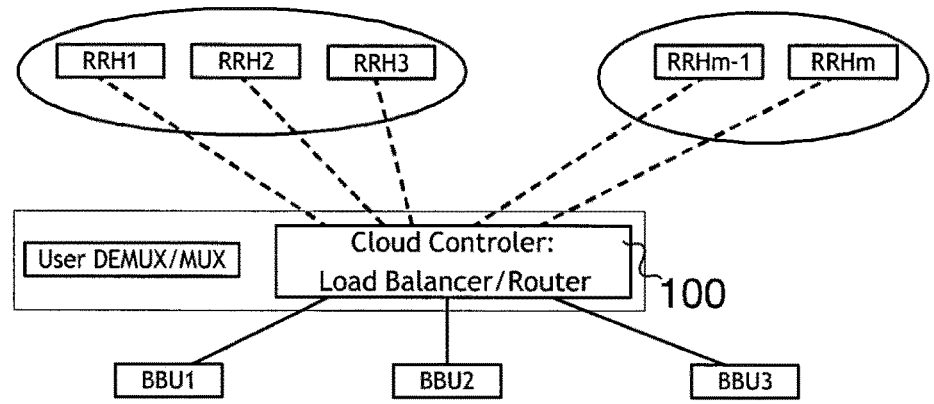
FIG. 6b shows a radio access network with an embodiment of a load balancer with demultiplexing/multiplexing at the load balancer.
Figure 6C:
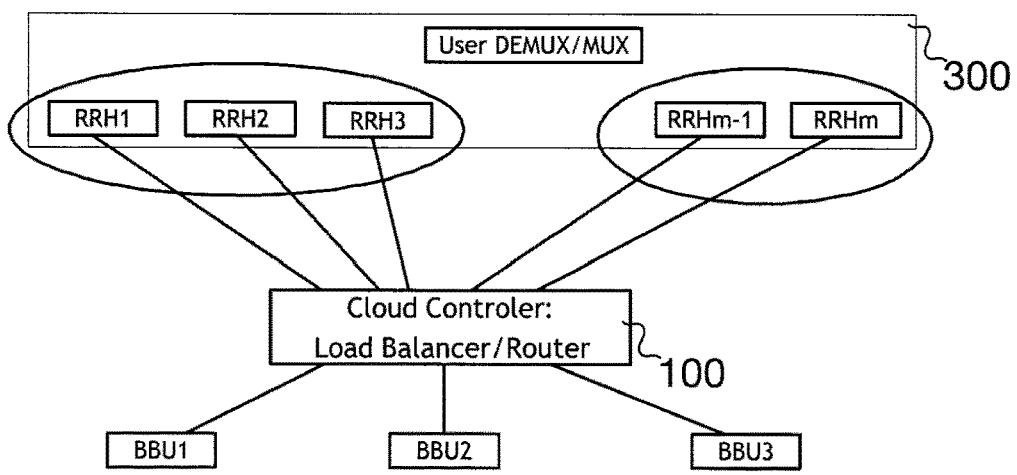
FIG. 6c shows a radio access network with an embodiment of a load balancer with demultiplexing/multiplexing at the radio head.

Several options exist in embodiments for the assignment of the user multiplexing/de-multiplexing to prepare the IQ samples, three of which will be illustrated and explained in more detail with the help of FIGS. 6a, 6b, and 6c. In the Figures dotted lines represent the transport of IQ samples, solid lines represent standard BB (as abbreviation for broadband) transport, both preferably via optical technologies. For example, for LTE the user multiplexing/de-multiplexing function consists of the OFDM Modulation/Demodulation, i.e. the IFFT (as abbreviation for Inverse Fast Fourier Transformation) and the FFT (as abbreviation for Fast Fourier Transformation). As another example, for UMTS the user multiplexing is done with the spreading/de-spreading with channelization codes. All options, however, may observe stringent latency requirements.

FIG. 6a shows a radio access network with an embodiment of a load balancer 100 with demultiplexing/multiplexing at the load balancer 100 and the baseband unit 200. As shown the user multiplexing or demultiplexing may be carried out at the BBU 200. Embodiments may therewith also provide a BBU 200. FIG. 1b shows an embodiment of a baseband unit 200 in more detail. The baseband unit 200 is adapted for processing a baseband receive signal, the baseband receive signal comprises a plurality of data packets. The BBU 200 comprises an interface 210 for receiving the baseband receive signal from a load balancing entity. Moreover, the BBU 200 comprises means for determining 220 a first receive data packet and a second receive data packet from the baseband receive signal, the first receive data packet and the second receive data packet being associated to different services. Furthermore, the BBU 200 comprises means for processing 230 the first receive data packet and for processing the second receive data packet.

Figure 1B:
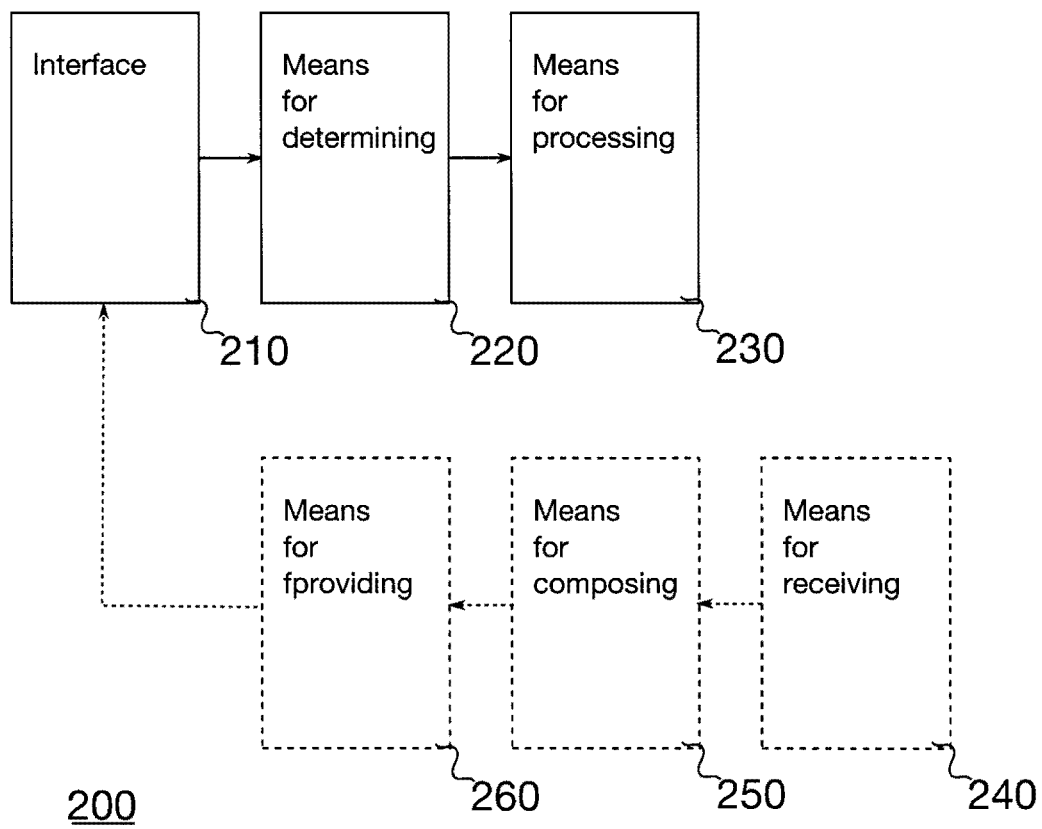
FIG. 1b shows an embodiment of a baseband unit.

In further embodiments the BBU 200 can be also adapted for multiplexing, as indicated by the broken line blocks in FIG. 1b. In embodiments the baseband unit 200 can comprise means for receiving 240 a first transmit data packet and means for receiving 240 a second transmit data packet. In FIG. 1b the same means for receiving 240 the first and second data packet is shown. In other embodiments separate means for receiving the first and the second data packet can be utilized. Moreover, the apparatus 200 comprises means for composing 250 a baseband transmit signal based on the first transmit data packet and based on the second transmit data packet, and means for providing 260 the baseband transmit signal to the load balancing entity using the interface. The baseband unit 200 can further be adapted for performing signal processing according to PHY, MAC, RLC for a radio bearer and/or cell broadcast functions.

In other words the demultiplexing and the multiplexing (DEMUX/MUX as abbreviation) may be carried out in the BBU 200 as indicated in FIG. 6a. DEMUX/MUX and packet inspection have to be in the cloud controller enabling load balancing mechanisms, as also indicated in FIG. 6a. This embodiment may offer compatibility with conventional non-cloud computing solutions at the RRH and BBU interface. In addition, existing compression algorithms can be directly applied.

FIG. 6b shows a radio access network with an embodiment of a load balancer 100 with demultiplexing/multiplexing at the load balancer 100 or cloud controller 100. The MUX/DEMUX in the cloud controller is carried out at the interface to the RRH. Therewith appropriate routing can be performed, the standardized CPRI interface can be applied. Embodiments may comprise a proprietary interface, i.e. the second interface 120, where all the RB signals will be transferred at the BBU to cloud controller interface as shown in FIG. 6b. The same advantages as for the embodiment shown in FIG. 6a may apply at the RRH interface. Furthermore, the cloud controller 100 may carry out a synchronization of the RRHs, for enabling advanced transmission techniques.

FIG. 6c shows a radio access network with an embodiment of a load balancer 100 with demultiplexing/multiplexing at the radio head 300. FIG. 1c shows an embodiment of a remote radio head 300 in more detail. The remote radio head 300 is adapted for communicating radio signals, a radio signal being received or transmitted from or to a plurality of transceivers. The RRH 300 comprises means for receiving 310 a receive signal in a transmission-band and means for converting 320 the receive signal from the transmission-band to a baseband to obtain a baseband receive signal. Moreover, the RRH 300 comprises means for determining 330 a first receive data packet and a second receive data packet from the baseband receive signal, the first receive data packet and the second receive data packet are associated to different services. The RRH 300 comprises an interface 350 for communicating with a load balancing entity and means for forwarding 340 the first and the second receive data packet to the load balancing entity using the interface. In other words, the RRH 300 is adapted for demultiplexing the RBs.

Figure 1C:
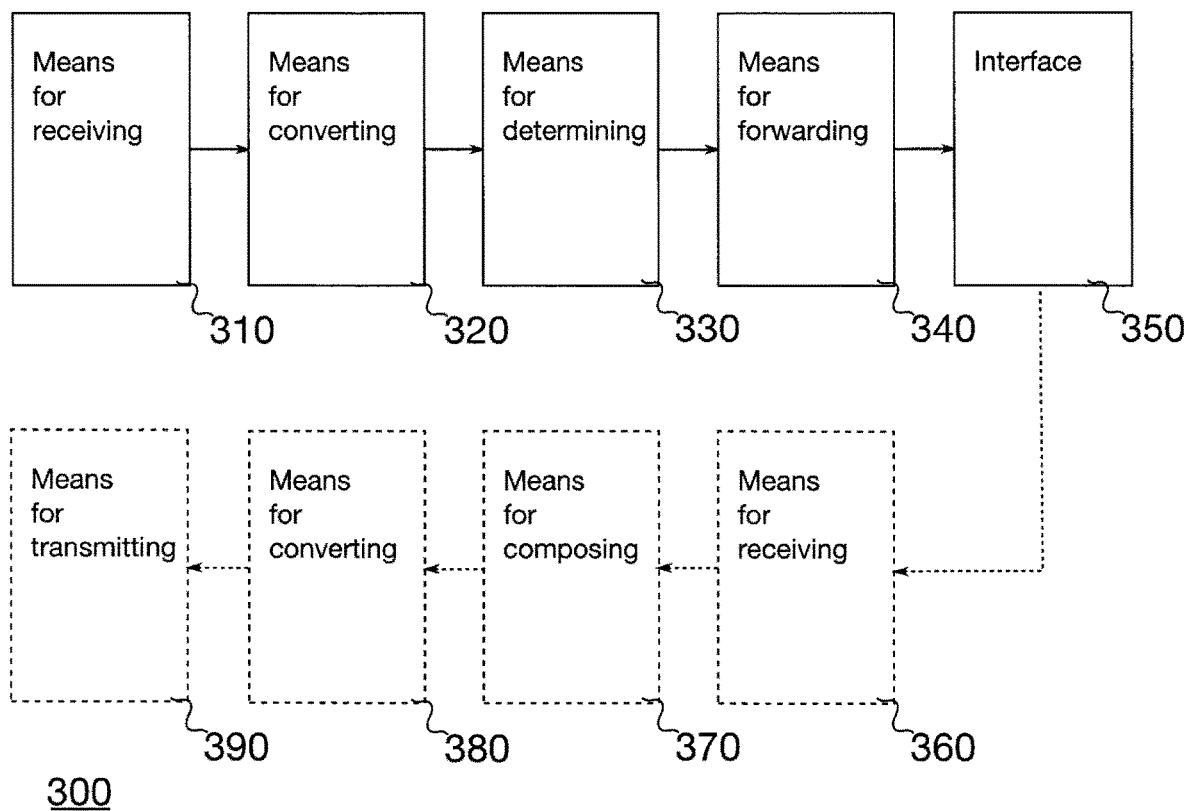
FIG. 1c shows an embodiment of a remote radio head.

In another embodiment, as illustrated by the broken line blocks in FIG. 1c, the RRH 300 may further be adapted for multiplexing the RB signals or packet for downlink transmission. Then, the RRH 300 can further comprise means for obtaining 360 a first transmit data packet and a second transmit data packet from the load balancing entity using the interface 350. Again, in embodiments different interface may be utilized for obtaining or receiving the first transmit data packet and the second transmit data packet. The RRH 300 can further comprise means for composing 370 a baseband transmit signal based on the first transmit data packet and the second transmit data packet, and means for converting 380 the transmit baseband signal to a transmit signal in the transmission-band. Furthermore, the RRH 300 may comprise means for transmitting 390 the signal in the transmission-band. The remote radio head (300) may further comprise a power amplifier for signal transmission and means for antenna processing.

According to the above embodiment, illustrated in FIG. 1c and FIG. 6c, the DEMUX/MUX may as well be carried out at the RRH 300. The RB signals may then be transported from the BBU to the RRH 300 via the cloud controller 100 observing stringent latency requirements, as shown in FIG. 6c. The embodiment of the cloud controller 300 may take care on the RB routing functions.

Out of the three different embodiments depicted in FIGS. 6a, 6b, and 6c, where the demux/mux functionality is carried out at different entities, the embodiment of FIG. 6c may provide additional advantages and is interesting for configurations, where one optical high-speed link does serve several RRHs 300. This may allow further statistical gains in the bandwidth dimensioning.

According to the above and as has been illustrated with the FIGS. 5, 6a, 6b and 6c, embodiments may provide a system for cloud computing with multiple RRHs, an apparatus for balancing the load, and multiple BBUs. According to the above, the multiplexing and demultiplexing can be carried out by any one of the above network entities, i.e. by the RRH, the load balancer or the BBU. Moreover, the processing of the different protocols of the RAN and therewith the assignment of the different functionalities can be different in different embodiments.

Summarizing, FIG. 5 shows an embodiment in which a RRH carries out radio transmission, with TRX, PA, and antenna processing. The cloud controller carries out load balancing, routing, O&M, cell broadcast functions (L3), call processing such as for the RRC protocol, and multi cell packet scheduling. A BBU carries out PHY, MAC, RLC for RB and cell broadcast functions.

FIGS. 6a, 6b, and 6c illustrate different embodiments, in which the mux/demux functionality is carried out at the three different entities RRH, cloud controller, and BBU. In FIG. 6a, mux/demux is within the BBU. Demux/mux and packet inspection are also in the cloud controller enabling load balancing mechanisms. In FIG. 6b, mux/demux is carried out in the cloud controller at the interface to the RRH. Appropriate routing can be performed, the standardized CPRI interface can be applied. There can be a proprietary interface where all the RB signals can be transferred at the BBU to Cloud Controller interface. In FIG. 6c, mux/demux is carried out in the RRH. RB signals are transported from the BBU to the RRH via the cloud controller observing stringent latency requirements. The cloud controller on its own has to take care on pure RB routing functions.

According to the above description, embodiments may provide the corresponding methods, which are also indicated by the block diagrams of FIGS. 1a, 1b and 1c, when interpreted as flow charts. Embodiments may, in line with FIG. 1a provide a method for balancing a load in a mobile communication network. The method may comprise a step of receiving 130 receive data from a radio transceiver using a first interface and a step of determining 140 a first receive data packet and a second receive data packet from the receive data, the first receive data packet and the second receive data packet being associated to different services. The method may further comprise a step of forwarding 150 the first receive data packet to a first processing unit using a second interface, and forwarding the second receive data packet to a second processing unit using the second interface.

In a further embodiment of the method, it may comprise receiving 160 a first transmit data packet from the first processing unit using the second interface and receiving 160 a second transmit data packet from the second processing unit using the second interface, the first transmit data packet and the second transmit data packet are associated to different services. The method may further comprise a step of composing 170 a baseband transmit signal based on the first transmit data packet and based on the second transmit data packet, and forwarding 180 the baseband transmit signal to the radio transceiver using the first interface.

Embodiments may also provide a method for processing a baseband receive signal in a baseband unit 200, the baseband receive signal comprising a plurality of data packets. The method may further comprise a step of receiving 210 the baseband receive signal from a load balancing entity and determining 220 a first receive data packet and a second receive data packet from the baseband receive signal, the first receive data packet and the second receive data packet are associated to different services. The method may further comprise a step of processing 230 the first receive data packet and processing the second receive data packet.

In further embodiments, the method may further comprise a step of receiving 240 a first transmit data packet and receiving 240 a second transmit data packet. The method may further comprise a step of composing 250 a baseband transmit signal based on the first transmit data packet and based on the second transmit data packet, and providing 260 the baseband transmit signal to the load balancing entity using the interface.

In further embodiments a method for communicating radio signals in a remote radio head 300 is provided, a radio signal being received or transmitted from or to a plurality of transceivers. The method may comprise a step of receiving 310 a receive signal in a transmission-band and converting 320 the receive signal from the transmission-band to a baseband to obtain a baseband receive signal. The method may further comprise a step of determining 330 a first receive data packet and a second receive data packet from the baseband receive signal, the first receive data packet and the second receive data packet being associated to different services and forwarding 340 the first and the second receive data packet to a load balancing entity using the interface.

In even further embodiments the method can comprise obtaining 360 a first transmit data packet and a second transmit data packet from the load balancing entity using the interface and composing 370 a baseband transmit signal based on the first transmit data packet and the second transmit data packet. The method may further comprise a step of converting 380 the transmit baseband signal to a transmit signal in a transmission-band, and transmitting 390 the signal in the transmission-band.

Moreover, embodiments may provide a computer program having a program code for performing one of the above methods when the computer program is executed on a computer or processor.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as magnetic disks and magnetic tapes, hard drives, or optically readable digital data storage media. The embodiments are also intended to cover computers programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functional blocks denoted as "means for . . . " (performing a certain function) shall be understood as functional blocks comprising circuitry that is adapted for performing a certain function, respectively. Hence, a "means for s.th." may as well be understood as a "means being adapted or suited for s.th.". A means being adapted for performing a certain function does, hence, not imply that such means necessarily is performing said function (at a given time instant).

The functions of the various elements shown in the Figures, including any functional blocks labeled as "means", "means for receiving", "means for determining", "means for forwarding", "means for composing", "means for processing", "means for providing", "means for converting", "means for obtaining", "means for transmitting", may be provided through the use of dedicated hardware, such as "a receiver", "a determiner", "a forwarder", "a composer", "a processor", "a provider", "a converter", an obtainer", "a transmitter", as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The invention claimed is:

1. An apparatus for balancing a load in a mobile communication network, comprising:
    a first interface configured to communicate with a radio transceiver;
    a second interface configured to communicate with a first processing unit and configured to communicate with a second processing unit;
    a baseband receiver configured to receive a multiplexed or demultiplexed baseband receive signal from the radio transceiver using the first interface;
    a determiner configured to determine a first receive data packet and a second receive data packet from the multiplexed or demultiplexed baseband receive signal, the first receive data packet and the second receive data packet being associated to different services; and
    a forwarder configured to forward the first receive data packet to the first processing unit using the second interface, and configured to forward the second receive data packet to the second processing unit using the second interface, wherein the radio transceiver corresponds to a remote radio head of the mobile communication network;
    wherein the first and the second receive data packets refer to different radio bearers, a radio bearer being a protocol context for a data service of a user;
    wherein the forwarder is configured to forward data packets of different radio bearers received from the radio transceiver to at least two different processing units from a plurality of processing units based on a load balancing criterion; and
    wherein a processing unit of the plurality of processing units is configured to be switched off for as long as other processing units can handle the load.

2. The apparatus of claim 1, further comprising:
    a first transmit data packet receiver configured to receive a first transmit data packet from the first processing unit using the second interface,
    a second transmit data packet receiver configured to receive a second transmit data packet from the second processing unit using the second interface, the first transmit data packet and the second transmit data packet being associated to different services,
    a composer configured to compose a baseband transmit signal based on the first transmit data packet and based on the second transmit data packet; and
    a forwarder configured to forward the baseband transmit signal to the radio transceiver using the first interface.

3. The apparatus of claim 2, wherein the composer is configured to compose the baseband transmit signal by multiplexing the first transmit data packet and the second transmit data packet, the first transmit data packet and the second transmit data packet being associated to different services provided by the mobile communication network in a coverage area of the radio transceiver.

4. The apparatus of claim 1, wherein the determiner is configured to demultiplex the first and the second receive data packet from the received data.

5. The apparatus of claim 1, wherein the radio transceiver corresponds to a transceiver for a GSM (Global System for Mobile communication), an EDGE (Enhanced Data Rates for GSM Evolution), a UMTS (Universal Mobile Telecommunication System), an LTE (Long Term Evolution), or an LTE-A (LTE-Advanced) mobile communication system.

6. The apparatus of claim 1, wherein the first interface corresponds to a common public radio interface (CPRI) and/or the first processing unit and the second processing unit corresponds to baseband units of a mobile communication system, a baseband unit being a processing unit for processing baseband signals of radio signals to be transmitted or having been received in a transmission-band.

7. The apparatus of claim 1, wherein the first interface is configured to exchange complex valued digital baseband data with the radio transceiver and wherein the second interface is configured to exchange complex valued digital baseband data with the first and the second processing unit and/or wherein the apparatus further comprises a third interface for communicating with another apparatus for exchanging control information.

8. The apparatus of claim 1, wherein the first interface corresponds to an optical interface for optical communication with the radio transceiver, and/or wherein the second interface corresponds to an optical interface for optical communication with the first or the second processing unit.

9. The apparatus of claim 1, further configured to perform load balancing, routing, O&M (Operation and Maintenance), cell broadcast functions (Layer 3), call processing for the RRC protocol (Radio Resource Control), and/or multi cell packet scheduling.

10. A system for cloud computing in a mobile communication network, the system comprising at least one of an apparatus for balancing a load according to claim 1,
  a remote radio head comprising a receiver configured to receive a receive signal in a transmission-band, a converter configured to convert the receive signal from the transmission-band to a baseband to obtain a baseband receive signal, a determiner configured to determine a first receive data packet and a second receive data packet from the baseband receive signal, the first receive data packet and the second receive data packet being associated to different services, an interface configured to communicate with a load balancing entity, a forwarder configured to forward the first and the second receive data packet to the load balancing entity using the interface, and a composer configured to multiplex or demultiplex the first and the second receive data packet, and,
  a baseband processing unit comprising an interface for receiving the baseband receive signal from a load balancing entity, a determiner configured to determine a first receive data packet and a second receive data packet from the baseband receive signal, the first receive data packet and the second receive data packet being associated to different services, and a processor configured to process the first receive data packet and configured to process the second receive data packet.

11. A remote radio head for communicating radio signals, a radio signal being received or transmitted from or to a plurality of transceivers, comprising:
  a receiver configured to receive a receive signal in a transmission-band;
  a converter configured to convert the receive signal from the transmission-band to a baseband to obtain a baseband receive signal;
  a determiner configured to determine a first receive data packet and a second receive data packet from the baseband receive signal, the first receive data packet and the second receive data packet being associated to different services;
  an interface configured to communicate with a load balancing entity;
  a composer configured to multiplex or demultiplex the first receive data packet and the second receive data packet; and
  a forwarder configured to forward the first and the second receive data packet to the load balancing entity using the interface;
  wherein the first and the second receive data packets refer to different radio bearers, a radio bearer being a protocol context for a data service of a user;
  wherein the forwarder is configured to forward data packets of different radio bearers received from the radio transceiver to at least two different processing units from a plurality of processing units based on a load balancing criterion; and
  wherein a processing unit of the plurality of processing units is configured to be switched off for as long as other processing units can handle a load.

12. The remote radio head of claim 11, further comprising:
  an obtainer configured to obtain a first transmit data packet and a second transmit data packet from the load balancing entity using the interface;
  a second composer configured to compose a baseband transmit signal based on the first transmit data packet and the second transmit data packet;
  a converter configured to convert the transmit baseband signal to a transmit signal in the transmission-band; and
  a transmitter configured to transmit the signal in the transmission-band.

13. The remote radio head of claim 11, further comprising:
  a power amplifier configured to transmit at least one signal; and
  an antenna processor.

14. A baseband unit for processing a baseband receive signal, the baseband receive signal comprising a plurality of data packets, the baseband unit comprising:
  an interface configured to receive the baseband receive signal from a load balancing entity; and
  a determiner configured to determine a first receive data packet and a second receive data packet from the baseband receive signal, the first receive data packet and the second receive data packet being associated to different services, wherein the first receive data packet and the second receive data packet were multiplexed or demultiplexed at a remote radio head;
  wherein the first and the second receive data packets refer to different radio bearers, a radio bearer being a protocol context for a data service of a user;
  wherein the base band unit further comprises at least two different processing units from a plurality of processing units configured to receive data packets of different radio bearers based on a load balancing criterion; and
  wherein a processing unit of the plurality of processing units is configured to be switched off for as long as other processing units can handle a load.

15. The baseband unit of claim 14, further comprising:
  a first transmit receiver configured to receive a first transmit data packet;
  a second transmit receiver configured to receive a second transmit data packet;
  a composer configured to compose a baseband transmit signal based on the first transmit data packet and based on the second transmit data packet; and
  a provider configured to provide the baseband transmit signal to the load balancing entity using the interface.

16. The baseband unit of claim 14, configured to perform signal processing according to PHY (Physical Layer Protocol), MAC (Medium Access Control protocol), RLC (Radio Link Control protocol) for a radio bearer and/or cell broadcast functions.

17. A method for balancing a load in a mobile communication network, comprising:
   receiving multiplexed or demultiplexed receive data from a radio transceiver using a first interface;
   determining a first receive data packet and a second receive data packet from the multiplexed or demultiplexed receive data, the first receive data packet and the second receive data packet being associated to different services;
   forwarding the first receive data packet to a first processing unit using a second interface, and forwarding the second receive data packet to a second processing unit using the second interface; and
   switching off a processing unit of the plurality of processing units as long as other processing units can handle the load;
   wherein the first and the second receive data packets refer to different radio bearers, a radio bearer being a protocol context for a data service of a user; and
   wherein the forwarding further comprises forwarding data packets of different radio bearers received from the radio transceiver to at least two different processing units from a plurality of processing units based on a load balancing criterion.

18. The method of claim 17, further comprising:
   receiving a first transmit data packet from the first processing unit using the second interface,
   receiving a second transmit data packet from the second processing unit using the second interface, the first transmit data packet and the second transmit data packet being associated to different services,
   composing baseband transmit signal based on the first transmit data packet and based on the second transmit data packet; and
   forwarding the baseband transmit signal to the radio transceiver using the first interface.

19. A non-transitory computer-readable medium having a program code for performing the method of claim 17 when the computer program is executed on a computer or processor.

20. A method for cloud computing in a mobile communication network, comprising:
   demultiplexing, with a remote radio head, a signal from a radio cell to obtain demultiplexed packets; and
   routing the demultiplexed packets to different processing units based on a load balancing criterion;
   wherein the different processing units are baseband units; and
   wherein the method further comprises switching off a baseband unit of the baseband units as long as other baseband units can handle the load.

21. A non-transitory computer-readable medium having a program code for performing the method of claim 20 when the computer program is executed on a computer or processor.

* * * * *